Figure 1A:
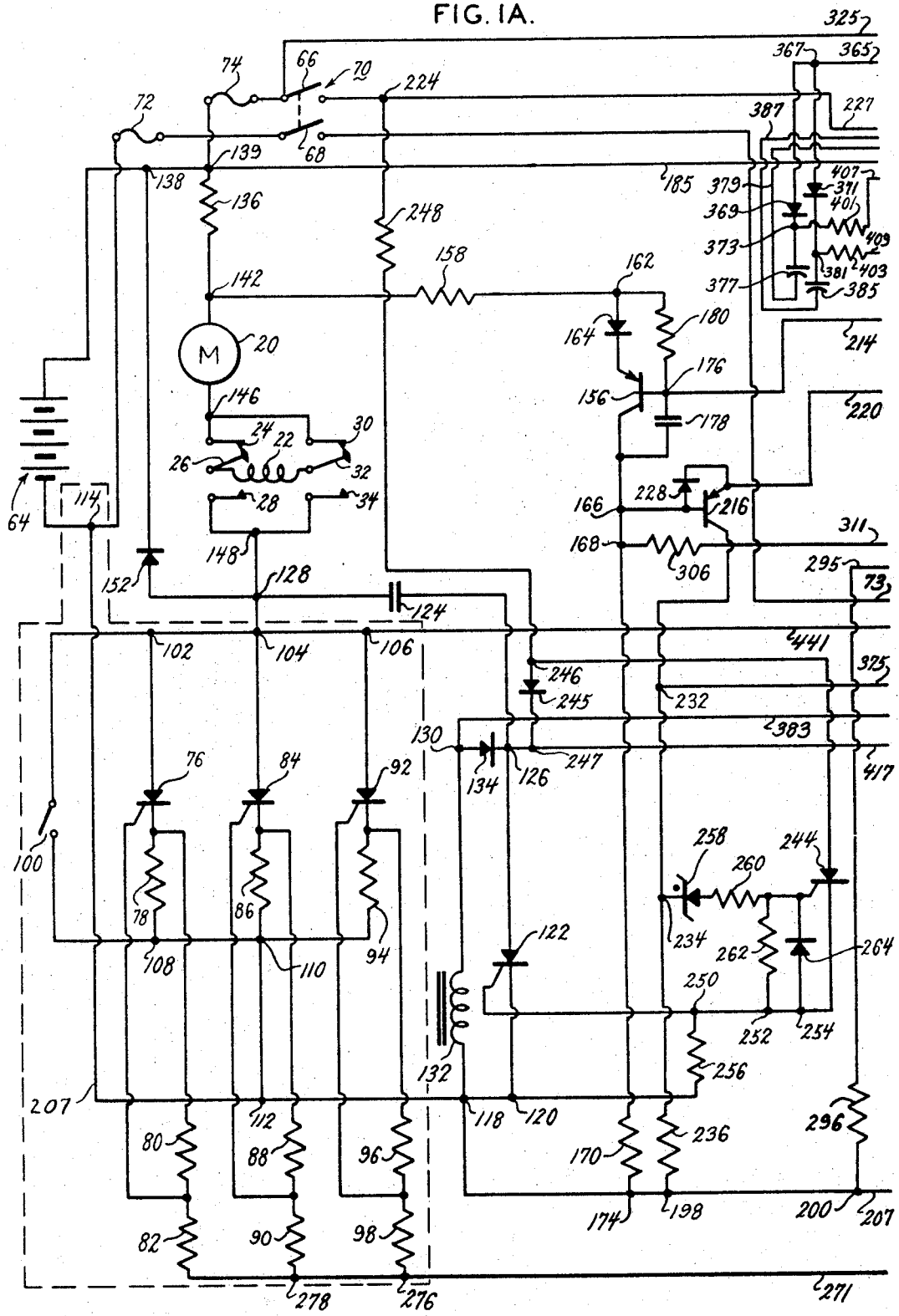

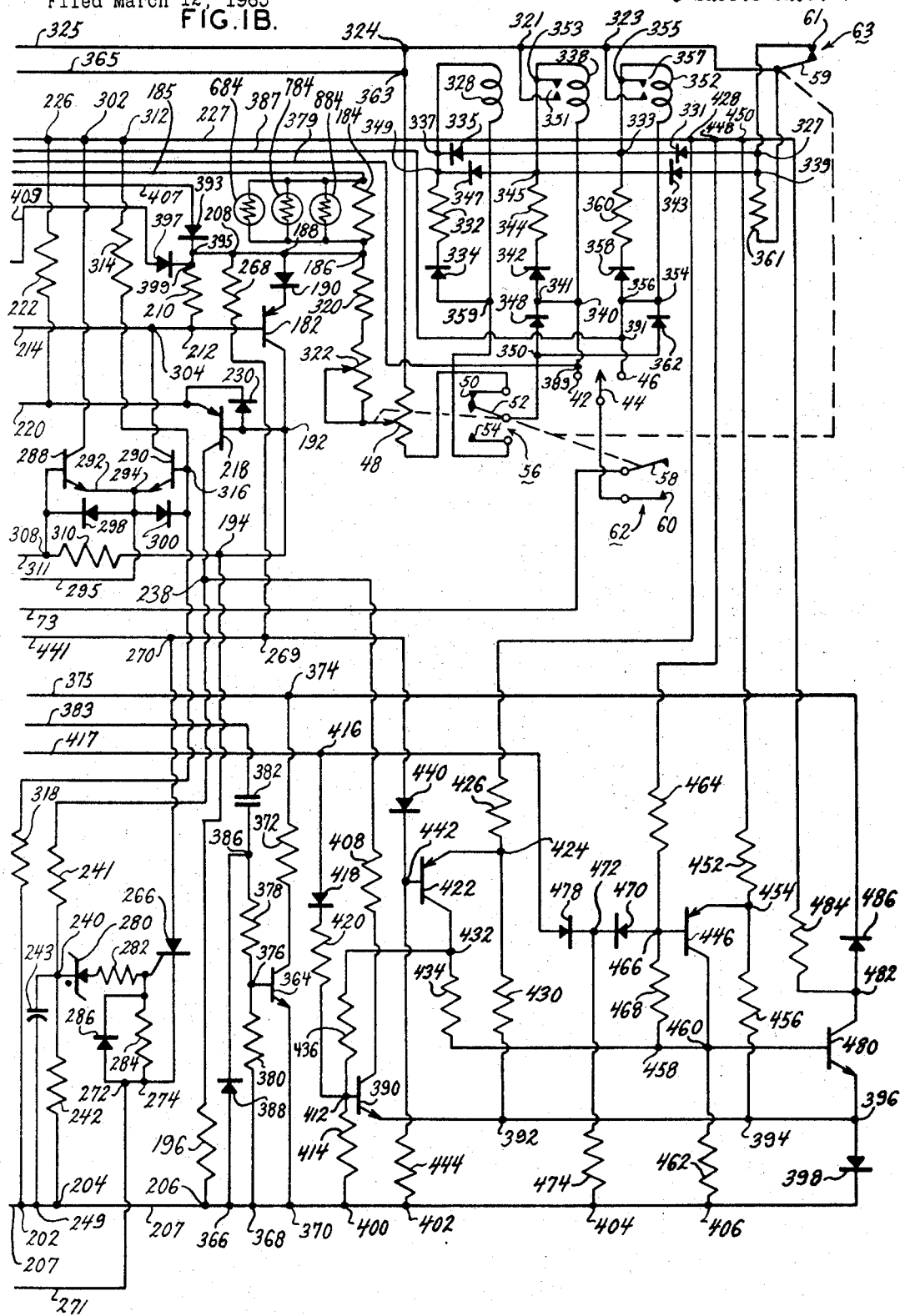

Dec. 3, 1968 — O. E. REINERT — 3,414,741

CONTROL SYSTEMS

Filed March 12, 1965 — 3 Sheets-Sheet 3 ns in Control
Systems. More particularly, this invention relates to improvements in control systems which employ solid state, current-controlling elements.

3,414,741
CONTROL SYSTEMS
Owen E. Reinert, St. Louis, Mo., assignor to Sperry Rand Corporation, New York, N.Y., a corporation of Delaware
Filed Mar. 12, 1965, Ser. No. 439,367
15 Claims. (Cl. 307—310)

This invention relates to improvements in Control Systems. More particularly, this invention relates to improvements in control systems which employ solid state, current-controlling elements.

It is, therefore, an object of the present invention to provide an improved control system which uses a solid state, current-controlling element.

In planning a control system that uses a solid state, current-controlling element, it is desirable to set the normal maximum current level for that solid state, current-controlling element so it is close to the maximum safe current level for that solid state, current-controlling element. Where that is done, the cost of the control system can be kept low, while the efficiency of that control system can be kept high. However, where that is done, the level of current flowing through that solid state, current-controlling element can occasionally tend to exceed that maximum safe current level; and, solid state, current-controlling elements can not safely carry such levels of current indefinitely. It would be desirable to provide a protective arrangement which could keep the level of current flowing through a solid state, current-controlling element from indefinitely exceeding the maximum safe current level of that solid state, current-controlling element. One such protective arrangement is disclosed in Harold C. Hoyt, Jr., application Ser. No. 413,055 for Control Systems which was filed Nov. 23, 1964; and that protective arrangement tends to keep the level of current flowing through the solid state, current-controlling element, with which it is used, from ever exceeding the maximum safe current level for that solid state, current-controlling element. As a result, that protective arrangement will fully protect any solid state, current-controlling element with which it is used. Because some solid state, current-controlling elements can, for short lengths of time, safely carry currents which exceed the maximum safe current level for those solid state, current-controlling elements, it would be desirable to provide a protective arrangement for a solid state, current-controlling element which would permit that solid state, current-controlling element to carry current levels which exceed the maximum safe current level of that solid state, current-controlling element, as long as those current levels are not maintained indefinitely. The present invention provides such a protective arrangement; and it is, therefore, an object of the present invention to provide a protective arrangement for a solid state, current-controlling element which will permit that solid state, current-controlling element to carry current levels which exceed the maximum safe current level of that solid state, current-controlling element, as long as those current levels are not maintained indefinitely.

The protective arrangement provided by the present invention senses the temperature of the solid state, current-controlling element with which it is used; and it will act to keep the currents carried by that solid state, current-controlling element from injuring that solid state, current-controlling element. That protective arrangement establishes an upper limit for the steady-state currents flowing through the solid state, current-controlling element; and that upper limit is close to the maximum safe current level of that solid state, current-controlling element. As long as the temperature of the solid state, current-controlling element is below a predetermined value, the protective arrangement will permit the current flowing through that solid state, current-controlling element to exceed that upper limit for short periods of time. This is acceptable, because a solid state, current-controlling element can usually withstand moderate overloads if those overloads are of short duration; and it is desirable, because it enables the solid state, current-controlling element to deliver extra large amounts of power for short periods of time. However, when the temperature of the solid state, current-controlling element reaches that predetermined value, the protective arrangement will keep the steady-state currents flowing through that solid state, current-controlling element from exceeding the said upper limit. It is, therefore, an object of the present invention to provide a temperature-sensing protective arrangement for a solid state, current-controlling element which establishes an upper limit for the steady-state currents flowing through that solid state, current-controlling element, which permits the current flowing through that solid state, current-controlling element to exceed that upper limit for short periods of time as long as the temperature of that solid state, current-controlling element is below a predetermined value, and which keeps the steady-state currents flowing through that solid state, current-controlling element from exceeding the said upper limit when the temperature of that solid state, current-controlling element reaches that predetermined value.

It is important to note that even when the temperaure of the solid state, current-controlling element reaches the said predetermined value, the protective arrangement provided by the present invention will not shut down the control system with which that solid state, current-controlling element is used. Instead, that protective arrangement will merely keep the steady-state currents flowing through that solid state, current-controlling element from exceeding the upper limit set by that protective arrangement. This is desirable, because it will enable the solid state, current-controlling element to deliver current at a level close to the maximum safe current level of that solid state, current-controlling element, and yet will protect that solid state, current-controlling element against injury due to long continued overloads; and it is also desirable because it will obviate needless and annoying "shutdowns" of the control system. It is, therefore, an object of the present invention to provide a temperature-sensing protective arrangement for a solid state, current-controlling element which will not shut down the control system with which that solid state, current-controlling element is used, even though that solid state, current-controlling element gets hot; and, instead, will merely keep the steady-state currents flowing through that solid state, current-controlling element from exceeding the upper limit set by that protective arrangement.

The protective arrangement provided by the present invention uses a thermistor to sense the temperature of the solid state, current-controlling element; and that thermistor is mounted in intimate, heat-exchanging relation with that solid state, current-controlling element. As long as the temperature of the solid state, current-controlling element is low, the resistance of the thermistor will be such that the protective ararngement will permit the current flowing through that solid state, current-controlling element to exceed the upper limit set by the protective arrangement. However, as the temperature of that solid state, current-controlling element increases, the resistance of the thermistor will change and will enable the protective arrangement to reduce the amount by which the current flowing through that solid state, current-controlling element can exceed that upper limit. When the temperature of the solid state, current-controlling element reaches a predetermined value, the resistance of the thermistor will be such that the protective arrangement will keep the steady-state currents flowing through the solid state, current-controlling element from exceeding that upper limit. It is, therefore, an object of the present invention to provide a protective arrangement which includes a thermistor that is mounted in intimate, heat-exchanging relation with a solid state, current-controlling element, which permits the current flowing through that solid state, current-controlling element to exceed the upper limit set by that protective arrangement, as long as the temperature of that solid state, current-controlling element does not exceed a predetermined value, and which will keep the steady-state currents flowing through that solid state, current-controlling element from exceeding that upper limit after the temperature of that solid state, current-controlling element has exceeded that predetermined value.

Other and further objects and advantages of the present invention should become apparent from an examination of the drawing and accompanying description.

In the drawing and accompanying description some preferred embodiments of the present invention are shown and described, but it is to be understood that the drawing and accompanying description are for the purpose of illustration only and do not limit the invention and that the invention will be defined by the appended claims.

Figure 2:
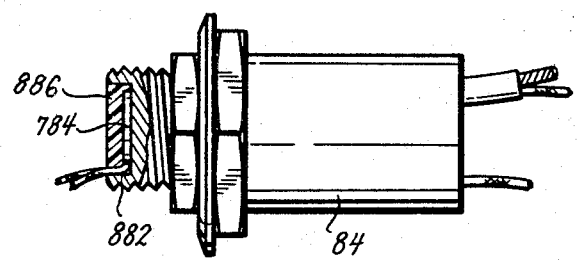
Figure 3:
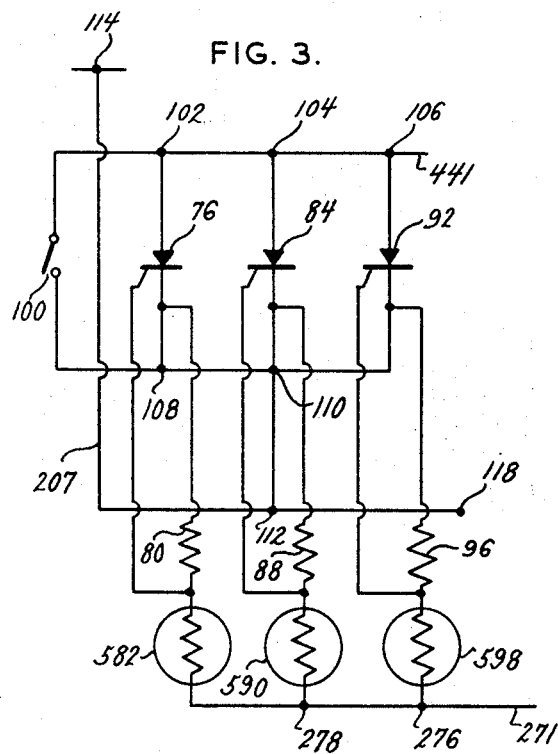
Figure 4:
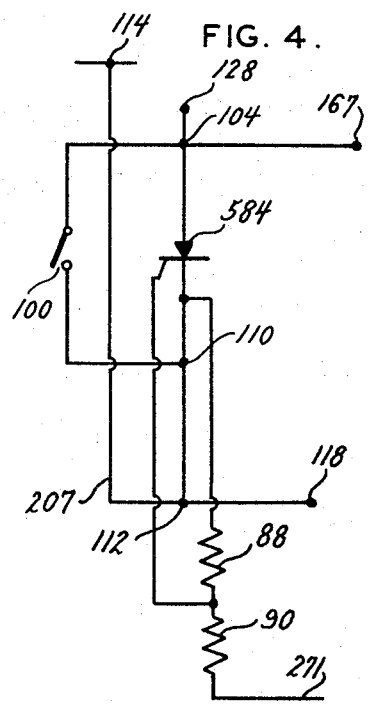
Figure 5:
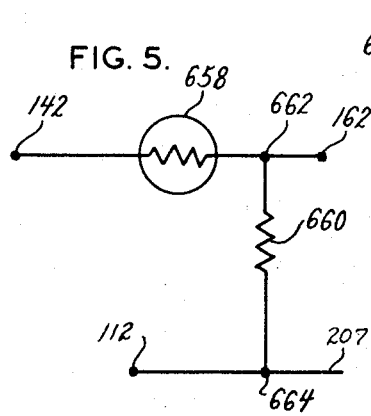
Figure 6:
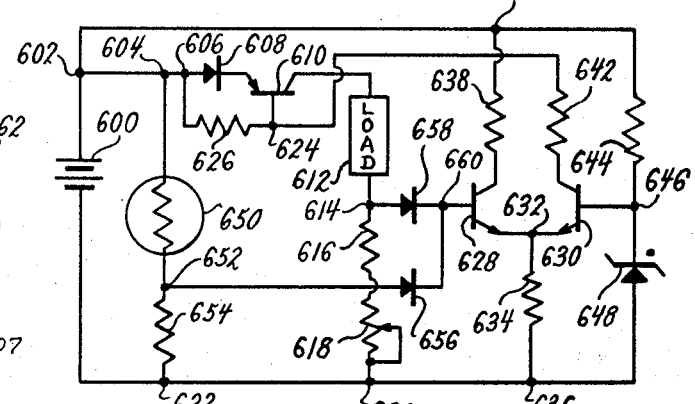

In the drawing and accompanying description, FIG. 1A is part of a schematic diagram showing one embodiment of control system with which the protective arrangement of the present invention can be used, FIG. 1B is the other part of that schematic diagram, FIG. 2 is a partially broken-away side view of a controlled rectifier which has a thermistor mounted in heat-exchanging relation therewith, FIG. 3 is a schematic showing of an alternate arrangement for connecting and firing the paralleled controlled rectifiers of FIG. 1A, FIG. 4 is a schematic showing of a controlled rectifier which can be substituted for the paralleled controlled rectifiers of FIG. 1A, FIG. 5 is a schematic showing of a thermistor and resistor which could be added to the control system of FIGS. 1A and 1B, and FIG. 6 is a schematic diagram of a transistor circuit with which the protective arrangement of the present invention can be used.

Referring to the drawing in detail, all of the numerals below 500 denote components which are identical to the correspondingly-numbered components of the said Hoyt application. Further, the function and operation of all components which are denoted by numerals below 500 are, except as described hereinafter, identical to the function and operation of the correspondingly-numbered components of the said Hoyt application.

As pointed out in the said Hoyt application, the armature winding 20 and the field winding 22 of a series-wound D.C. motor, for an electrically-driven vehicle, can be connected in series with a sensing resistor 136 and with parallel-connected controlled rectifier 76 and resistor 78, controlled rectifier 84 and resistor 86, and controlled rectifier 92 and resistor 94—that armature winding and that field winding being so connected by "forward" relay contact 26 or by "reverse" contact 32. When the "forward" relay contact 26 engages the fixed contact 28, the rotor of the motor will start rotating in the forward direction; and when the "reverse" relay contact 32 engages the fixed contact 34, that rotor will start rotating in the reverse direction.

Also as pointed out in the said Hoyt application, the differential amplifier, which includes the transistors 288 and 290, coacts with the voltage averaging circuit, that includes the resistors 306 and 310, to cause the base-connected transistors 156 and 182 to operate as a differential amplifier. The differential amplifier, which includes the transistors 216 and 218, responds to signals from the differential amplifier, which includes the transistors 156 and 182, to selectively cause firing of controlled rectifier 244 or of controlled rectifier 266. Resistor 184 in FIG. 1B constitutes a reference resistor that is connected to the emitter of transistor 182 by the diode 190; and that reference resistor is selectively connected to the negative terminal of the battery 64 by resistor 320, adjustable resistor 322, the movable contact and lower section of potentiometer 48, switch 56, the contacts 42, 44 and 46 of the forward-reverse switch, and switch 62. Whenever the contact 44 is in its "forward" or "reverse" position and the switch 62 is closed, current, will flow through resistor 184 and develop a voltage drop across that resistor. Resistor 158 and diode 164 in FIG. 1A apply the voltage at the junction 142 to the emitter of the transistor 156. Whenever current flows through the motor windings 20 and 22, that current will also flow through the sensing resistor 136 and develop a voltage drop across that resistor.

As pointed out in the said Hoyt application, whenever the voltage drop across the reference resistor 184 in FIG. 1B exceeds the sum of the voltage drops across sensing resistor 136 and resistor 158, at a time when the controlled rectifiers 76, 84 and 92 are non-conductive, the differential amplifiers will make the voltage across the resistor 242 in FIG. 1B large enough to render the Zener diode 280 conductive; and the resulting flow of current through the resistor 284 will "fire" the controlled rectifier 266, and thus cause "firing" of the controlled rectifiers 76, 84 and 92. A progressively-increasing current will then flow through the sensing resistor 136, the motor windings 20 and 22, and the controlled rectifiers 76, 84 and 92; and that current will develop a progressively-increasing voltage drop across the sensing resistor 136. When the sum of that voltage drop and the voltage drop across resistor 158 exceeds the voltage drop across the reference resistor 184 in FIG. 1B, the differential amplifiers will increase the voltage across the resistor 236 in FIG. 1A to the point where the Zener diode 258 will become conductive; and the resulting flow of current through the resistor 262 will "fire" the controlled rectifier 244, and thus cause "firing" of the controlled rectifier 122. The commutating capacitor 124 then will cause inverse current to tend to flow through the controlled rectifiers 76, 84, 92 and 266, and thereby render those controlled rectifiers non-conductive.

Further, as pointed out in the said Hoyt application, the resistor 268 in FIG. 1B is connected in series with the reference resistor 184 and with parallel-connected controlled rectifier 76 and resistor 78, controlled rectifier 84 and resistor 86, and controlled rectifier 92 and resistor 94; and, whenever those controlled rectifiers are conductive, an appreciable amount of current will flow serially through reference resistor 184, resistor 268, and those controlled rectifiers. However, whenever those controlled rectifiers are not conductive, only a small amount of leakage current will serially flow through reference resistor 184, resistor 268, and those controlled rectifiers. The difference between the amounts of current flowing through the reference resistor 184, when the controlled rectifiers 76, 84 and 92 are conductive and when those controlled rectifiers are non-conductive, is substantial; and that difference will enable those controlled rectifiers to remain non-conductive between the time the differential amplifiers respond to the voltage drop across the sensing resistor 136 to "fire" the controlled rectifier 244 and the time when the voltage drop across the reference resistor 184 again exceeds the sum of the voltage drops across sensing resistor 136 and resistor 158.

Also as explained in the said Hoyt application, the relay coil 338 in FIG. 1B responds to shifting of the contact 44 into engagement with the "forward" contact 42 to shift the "forward" relay contact 26 down into engagement with the fixed contact 28. On the other hand, the relay coil 352 in FIG. 1B responds to shifting of the contact 44 into engagement with the "reverse" contact 46 to shift the "reverse" movable contact 32 down into engagement with the fixed contact 34. Relay coil 328 controls the normally-open shunting contacts 100 in FIG. 1A; and that relay coil will be energized whenever the movable contact 44 is in engagement with contact 42 or contact 46 and the accelerator pedal has been moved far enough downwardly to shift the contact 52 of switch 56 into engagement with the contact 54.

In addition, as pointed out in the said Hoyt application, the transistors 364, 390, 422, 446 and 480 and the circuitry associated therewith prevent premature firing of controlled rectifiers 244 and 122 and of controlled rectifier 266. Moreover, those transistors and the circuitry associated therewith assure firing of those controlled rectifiers whenever those controlled rectifiers should be fired. The switch 63 and the resistor 361 in FIG. 1B prevent abrupt reversal of the direction of rotation of the rotor of the motor whenever the accelerator pedal is in a high power setting. The capacitors 377 and 385 in FIG. 1A coact with the relay coils 338 and 352 in FIG. 1B to minimize arcing at the relay contacts 26 and 32 whenever the movable contact 44 is moved out of engagement with either of the fixed contacts 42 and 46 at a time when the accelerator is in position calling for the application of power to the motor windings 20 and 22.

The present invention modifies the control system of the said Hoyt application by disposing thermistors in intimate, heat-exchanging relation with the controlled rectifiers 76, 84 and 92, and FIG. 2 shows one way of mounting those thermistors in intimate, heat-exchanging relation with those controlled rectifiers. Specifically, a shallow, cylindrical recess 882 is formed in the anode end of the controlled rectifier 84; and a thermistor 784 is disposed within that recess. That thermistor will preferably abut the inner wall of that recess—to provide a large heat exchanging area between that controlled rectifier and that thermistor; and a suitable bonding material, such as an epoxy resin 886, will be used to hold that thermistor within that recess. The leads of the thermistor 784 extend outwardly through the epoxy resin 886, and those leads will be suitably connected into the control system. In FIG. 1B, the leads of the thermistors 684, 784 and 884 are connected to each other and to the upper and lower terminals of the reference resistor 184; and hence those thermistors are connected in parallel with that reference resistor and with each other. The thermistor 684 is mounted in intimate, heat-exchanging relation with the controlled rectifier 76; and the thermistor 884 is mounted in intimate, heat-exchanging relation with the controlled rectifier 92.

By providing the thermistors 684, 784 and 884, the present invention makes it possible to eliminate the series-connected Zener diode and resistor which the control system of the said Hoyt application connects between the resistor 158 and the fixed relay contacts 28 and 34. Also, by providing the thermistors 684, 784 and 884, the present invention makes it possible to eliminate the integrating capacitor which the control system of the said Hoyt application connects to that Zener diode. Further, by providing the thermistors 684, 784 and 884, the present invention makes it possible to safely increase the amount of power which the controlled rectifiers 76, 84 and 92 can supply to the motor windings 20 and 22.

The thermistors 684, 784 and 884 are negative temperature coefficient thermistors; and the room-temperature ohmic value of each of those thermistors greatly exceeds the ohmic value of the reference resistor 184. For example, in one preferred embodiment of the present invention, each of the thermistors 684, 784 and 884 has an ohmic value of approximately two hundred and twenty-five ohms, whereas the reference resistor 184 has an ohmic value of approximately seventy-five ohms. Because the three thermistors 684, 784 and 884 are connected in parallel with each other, the combined, room-temperature, ohmic value of those thermistors is approximately seventy-five ohms; and that ohmic value is approximately the same as the ohmic value of the reference resistor 184. Because the three parallel-connected thermistors 684, 784 and 884 are connected in parallel with the reference resistor 184, the overall room temperature, ohmic value of those three thermistors and of that reference resistor is less than forty ohms. This is desirable because it enables leakage current through the one hundred and eighty ohm resistor 158 to produce a voltage drop across that resistor that is higher than the voltage drop which leakage current produces across the parallel-connected thermistors 684, 784, and 884 and resistor 184; and the larger voltage drop across resistor 158 biases the control system to render the controlled rectifiers 76, 84 and 92 nonconductive, prior to the time the movable contact 44 of the forward-reverse switch is shifted into engagement with its "forward" contact or its "reverse" contact. That larger voltage drop across resistor 158 also biases the control system to render those controlled rectifiers non-conductive in the event any lead should break, or any resistor or switch should "open," and thereby disconnect the lower terminal of the resistor 184 from the negative terminal of the battery 64.

The resistors 78, 86 and 94 tend to equalize the values of the currents flowing through the paralleled controlled rectifiers 76, 84 and 92; and hence it will be assumed that the value of the current flowing through any one of those controlled rectifiers at any given instant will be substantially equal to the value of the current flowing through each of the other of those controlled rectifiers at that instant. Whenever the steady-state currents flowing through the paralleled controlled rectifiers 76, 84 and 92 are close to the maximum safe current levels of those controlled rectifiers, the temperatures of the junctions within those controlled rectifiers will, in the said one preferred embodiment of the present invention, be close to one hundred and fifty degrees centigrade; and the temperatures in the recesses in the anode ends of those controlled rectifiers, and hence the temperatures of thermistors 684, 784, and 884, will be close to one hundred and thirty-five degrees centigrade. At such time, the resistance of each of those thermistors will be very much smaller than the room temperature resistance thereof; and hence the overall ohmic value of those three thermistors and of reference resistor 184 will be much less than forty ohms. This is important, because it will limit the maximum voltage drop, which can be developed across those three thermistors and reference resistor 184, to such a low level that the steady-state current flowing through the paralleled controlled rectifiers 76, 84 and 92 can not exceed four hundred and fifty amperes. Such a steady-state current is below the maximum safe current level of those paralleled controlled rectifiers; and hence those paralleled controlled rectifiers will be protected against injury. While the total amount of power that the control system can supply to the motor at such time will be limited, that amount of power will be ample to enable the motor to sustain normal loads.

Whenever the steady-state currents flowing through the paralleled controlled rectifiers 76, 84 and 92 are well below the maximum safe current levels of those controlled rectifiers, the temperatures of the junctions within those controlled rectifiers will, in the said one preferred embodiment of the present invention, be well below one hundred and fifty degrees centigrade; and the temperatures in the recesses in the anode ends of those controlled rectifiers, and hence the temperatures of thermistors 684, 784 and 884, will be well below one hundred and thirty-five degrees centigrade. The lower the temperatures of those thermistors, the higher the resistances thereof will be; and hence the arger the attainable voltage drops across those thermistors will be. Such larger voltage drops will make it possibe to increase the values of current which the paralleled controlled rectifiers 76, 84 and 92 can supply to the motor.

All of this means that whenever the temperatures of the thermistors 684, 784 and 884 are below the level corresponding to the maximum safe current level of the paralleled controlled rectifiers 76, 84 and 92, a voltage drop can be developed across those thermistors and reference resistor 184 which will enable the control system to supply current levels to the motor which are greater than four hundred and fifty amperes. However, whenever the temperatures of the thermistors 684, 784 and 884 approach the level corresponding to the maximum safe current level of the paralleled controlled rectifiers 76, 84 and 92, the resistances of those thermistors will be so small that the maximum voltage drop which can be developed across those thermistors and reference resistor 184 will be so small that the maximum current levels which the control system will be abe to supply to the motor will not exceed four hundred and fifty amperes. In that way, the protective arrangement provided by the present invention automatically protects the controlled rectifiers 76, 84 and 92 from injury due to large steady-state currents.

In the control system of the said Hoyt application, the protective arrangement includes a series-connected Zener diode and resistor that are effectively connected across the motor windings; and that Zener diode is essentially non-conductive as long as the average voltage across those motor windings is less than twenty volts. When, however the average voltage across those motor windings exceeds twenty volts, that Zener diode will become conductive and will automatically reduce the upper limit of the steady-state current, which can flow through the controlled rectifiers, to a value considerably smaller than four hundred and fifty amperes. This means that the protective arrangement of the said Hoyt application does not reduce the upper limit of the steady-state current flowing through the controlled rectifiers until the average voltage across the motor windings exceeds twenty volts, and then automatically reduces that upper limit to a value considerably smaller than four hundred and fifty amperes, irrespective of the temperatures of those controlled rectifiers. In contrast, the protective arrangement provided by the present invention never reduces the upper limit on the steady-state current flowing through the controlled rectifiers 76, 84 and 92 below four hundred and fifty amperes. Furthermore, that protective arrangement enables the current supplied to the motor to exceed four hundred and fifty amperes for short periods of time, even when the average voltage across the motor windings exceeds twenty volts. The resistances of the thermistors 684, 784 and 884 will, of course, decrease as the temperatures of the controlled rectifiers 76, 84 and 92 increase, and the resulting decrease in maximum attainable voltage drops across those thermistors and reference resistor 184 will reduce the maximum attainable current levels for those controlled rectifiers; but those maximum attainable levels will still be larger than four hundred and fifty amperes until the temperatures of those thermistors approach one hundred and thirty-five degrees centigrade. As a result, the operation of the control system shown in FIGS. 1A and 1B will, until the average voltage across the motor windings reaches twenty volts, be very similar to the operation of the control system of the said Hoyt application. However, when the levels of the current flowing through the controlled rectifiers 76, 84 and 92 rise to the point where the average voltage across the motor windings 20 and 22 exceeds twenty volts, the control system of the present invention will not abruptly reduce the upper limit of the current which can flow through those controlled rectifiers; whereas the control system of the said Hoyt application will do so. Not until such time as the temperature in the recess in the anode end of one or more of the controlled rectifiers 76, 84 and 92 rises to about one hundred and thirty-five degrees centigrade will the current flowing through those controlled rectifiers be limited to a maximum of four hundred and fifty amperes—assuming, of course, that the setting of the movable contact of the potentiometer 48 remains unchanged and that the position of the movable contact 44 remains unchanged.

If the level of current flowing through any one of the controlled rectifiers 76, 84 and 92 rises to the point where the current-induced temperature and the ambient temperature cause the temperature in the recess in the anode end of that controlled rectifier to approach one hundred and thirty-five degrees centigrade, the resistance of the thermistor within that recess will decrease to the point where the overall ohmic value of the parallel-connected thermistors 684, 784 and 884 and reference resistor 184 will be much smaller than forty ohms. As a result, the maximum voltage drop, which the current flowing through resistor 268 and controlled rectifiers 76, 84 and 92 plus the current flowing through the lower section of potentiometer 48, can develop across those thermistors and that reference resistor will be much less than it was when that thermistor was at room temperature. That much smaller voltage drop will enable a level of current which does not exceed four hundred and fifty amperes, flowing through the controlled rectifiers 76, 84 and 92, to make the sum of the voltage drops across sensing resistor 136 and resistor 158 equal that much smaller voltage drop. That level of current will enable the current flowing through each of those controlled rectifiers to be below the maximum safe current level of that controlled rectifier; and hence that current will not constitute a potential danger to that controlled rectifier. Significantly, the thermistor associated with the heated controlled rectifier did not shut down the control system; and, instead, permitted that control system to continue to supply power to the motor of the electrically-driven vehicle—merely limiting the level of current flowing through the controlled rectifiers to the point where none of those controlled rectifiers could be injured.

Subsequently, when the level of current flowing through the controlled rectifiers 76, 84 and 92 is reduced, by a decrease in the load or by a change in the setting of the movable contact of potentiometer 48, the thermistors 684, 784 and 884 will cool. As the temperature of the overheated thermistor falls, the control system will automatically increase the level of current which could be supplied to the motor. However, until such time as the temperature of that overheated thermistor does fall, that thermistor will continue to cause the differential amplifiers to hold the level of current flowing through the controlled rectifiers 76, 84 and 92 at a level below the maximum safe current level of each of those controlled rectifiers. In this way, the protective arrangement provided by the present invention automatically and fully protects the controlled rectifiers of the control system against injury due to higher-than-normal currents which tend to continue for longer-than-normal lengths of time. Further, that protective arrangement enables the control system to continue to operate, albeit at a reduced current level.

The resistors 78, 86 and 94 in FIGS. 1A and 1B are useful; and their ohmic values are so low that they do not dissipate much power. However, by eliminating those resistors it is possible to increase the overall efficiency of the control system; and the present invention eliminates those resistors by incorporating thermistors into the firing circuits of the controlled rectifiers. Thus, in FIG. 3, thermistors 582, 590 and 598 have been substituted for the resistors 82, 90 and 98 in FIG. 1A, and the resistors 78, 86 and 94 have been eliminated. Specifically, the sub-circuit shown in FIG. 3 has been substituted for the sub-circuit enclosed by dashed lines in FIG. 1A. The thermistor 582 will be mounted in heat-exchanging relation with the controlled rectifier 76, the thermistor 590 will be mounted in heat-exchanging relation with the controlled rectifier 84, and the thermistor 598 will be mounted in heat-exchanging relation with the controlled rectifier 92. Preferably, the thermistor 582 will be mounted in the same recess 882 in controlled rectifier 76 in which the thermistor 684 is mounted. Similarly, the thermistor 590 will preferably be mounted in the same recess 882 in the controlled rectifier 84 in which the thermistor 784 is mounted; and the thermistor 598 will preferably be mounted in the same recess 882 in the controlled rectifier 92 in which the thermistor 884 is mounted. The thermistors 582, 590 and 598 are positive temperature coefficient thermistors, and the resistances of those thermistors will reach predetermined high values whenever the temperatures of those thermistors approach one hundred and forty-five degrees centigrade; and those high values are high enough to prevent "firing" of the controlled rectifiers.

Thus, if the temperature in the recess in the anode end of controlled rectifier 76 approaches one hundred and forty-five degrees centigrade—and the temperature at the junction in that controlled rectifier approaches one hundred and sixty degrees centigrade—the resistance of the thermistor 582 will increase to the point where the current flowing through controlled rectifier 266 in FIG. 1B will predominantly flow through thermistor 598, the gate-to-cathode circuit of controlled rectifier 92, and conductor 207 and also through thermistor 590, the gate-to-cathode circuit of controlled rectifier 84, and conductor 207, rather than through thermistor 582, the gate-to-cathode circuit of controlled rectifier 76, and conductor 207. As a result, the controlled rectifiers 84 and 92 will fire whenever the controlled rectifier 266 in FIG. 1B becomes conductive, but the controlled rectifier 76 will not fire. The level of current flowing through the controlled rectifier 76 will then drop close to zero, but the levels of current flowing through the controlled rectifiers 84 and 92 will not drop. Instead those levels of current can be as high as desired until such time as the temperatures in the recesses in the anode ends thereof approach one hundred and forty-five degrees centigrade. The controlled rectifier 76 will remain non-conductive as long as it is overheated; but its temperature will begin to drop as soon as it is rendered non-conductive. As a result, the temperature of that controlled rectifier, and of the thermistor 582, will fall to a value at which the resistance of the thermistor will again be low enough to permit sufficient current to flow through it to fire the controlled rectifier 76. Thereafter, all of the controlled rectifiers 76, 84 and 92 will be fired, whenever the controlled rectifier 266 in FIG. 1B is rendered conductive, until such time as controlled rectifier 76 again becomes heated or controlled rectifier 84 or controlled rectifier 92 becomes heated.

In the event controlled rectifier 84 or controlled rectifier 92, rather than controlled rectifier 76, becomes heated, the thermistor 590 or the thermistor 598 will experience an increase in the resistance thereof; and that increased resistance will keep the current flowing through the controlled rectifier 266 in FIG. 1B from firing the controlled rectifier associated with that thermistor. That controlled rectifier will then begin to cool; and when that controlled rectifier, and the thermistor associated with it, cool sufficiently, the resistance of that thermistor will drop to the point where the next firing of the controlled rectifier 266 in FIG. 1B will again cause firing of all of the controlled rectifiers 76, 84 and 92.

It will be noted that the thermistors 582, 590 and 598 do not supplant, but are in addition to the thermistors 684, 784 and 884. This is very desirable, because the thermistors 582, 590 and 598 could, if used without the thermistors 684, 784 and 884, successively render the controlled rectifiers 76, 84 and 92 non-conductive and thus shut down the control system; and it also is very desirable because the thermistors 684, 784 and 884 could, if used without either the thermistors 582, 590 and 598 or the resistors 78, 86 and 94 of FIG. 1A, permit one of the controlled rectifiers 76, 84 and 92 to carry such a high value of steady-state current that it would be injured. However, when the thermistors 582, 590 and 598 are used in conjunction with the thermistors 684, 784 and 884, all of the controlled rectifiers 76, 84 and 92 are protected against injury due to steady-state currents. Further, although one or even two of the thermistors 582, 590 and 598 could render one or two of the controlled rectifiers 76, 84 and 92 non-conductive, one of the thermistors 684, 784 and 884 would reduce the upper limit of the current flowing through the still-conductive controlled rectifiers or controlled rectifier to the point where the temperatures or temperature of the still-conductive controlled rectifiers or controlled rectifier would be too low to enable any of the thermistors 582, 590 and 598 to render the still-conductive controlled rectifiers or controlled rectifier non-conductive.

If the conductive resistances of all of the paralleled controlled rectifiers 76, 84 and 92 happened to be substantially the same, the temperatures in the recesses in the anode ends of those controlled rectifiers would be substantially equal. Further, when the total current flowing through those controlled rectifiers was close to four hundred and fifty amperes, the temperatures in those recesses would be close to one hundred and thirty-five degrees centigrade; and the resistance of each of the thermistors 684, 784 and 884 would be substantially nine ohms—just a small fraction of the room-temperature resistance of two hundred and twenty-five ohms of each of those thermistors. The combined resistance of the paralleled reference resistor 184 and thermistors 684, 784 and 884 would then be about two and eighty-eight hundredths ohms—just a fraction of the room-temperature resistance of thirty-seven and one-half ohms; and that combined resistance would be low enough to keep the total current flowing through the paralleled controlled rectifiers 76, 84 and 92 from exceeding four hundred and fifty amperes.

However, the conductive resistances of controlled rectifiers usually differ; and hence the conductive resistance of one of the paralleled controlled rectifiers 76, 84 and 92 will usually be less than the conductive resistance of either of the other of those controlled rectifiers. If the conductive resistances of controlled rectifiers 84 and 92 were equal but the conductive resistance of controlled rectifier 76 was three-quarters of the conductive resistance of either of controlled rectifiers 84 and 92, the value of the current flowing through controlled rectifier 76 would be one and one-third times the value of the current flowing through either of controlled rectifiers 84 and 92. This means that the current-induced heating of controlled rectifier 76 would be one and one-third times the current-induced heating of either of controlled rectifiers 84 and 92. As a result, the temperature in the recess in the anode end of controlled rectifier 76 would be close to one hundred and forty-five degrees centigrade when the total current flowing through the controlled rectifiers 76, 84 and 94 approached four hundred and fifty amperes—even though the temperatures in the recesses in the anode ends of controlled rectifiers 84 and 92 would be only about one hundred and ten degrees centigrade. At such a time the current flowing through controlled rectifier 76, would if the thermistors 582, 590 and 598 were not provided, be about one hundred and eighty amperes while the current flowing through each of controlled rectifiers 84 and 92 would be about one hundred and thirty-five amperes. Also at this time, the ohmic resistance of the thermistor 684 would be only about six whereas the ohmic resistance of each of thermistors 784 and 884 would be about twelve. This means that the combined resistance of thermistors 684, 784 and 884 and reference resistor 184 would be approximately two and ninety-five hundredths ohms. Since that combined resistance is larger than the combined resistance of two and eighty-eight hundredths ohms which is needed to keep the total current flowing through the controlled rectifiers 76, 84 and 92 from exceeding four hundred and fifty amperes, the thermistors 684, 784 and 884 could not, by themselves, be relied upon to hold the level of current flowing through controlled rectifier 76 to one hundred and fifty amperes.

However, where thermistors 582, 590 and 598 are used in conjunction with thermistors 684, 784 and 884, the thermistor 582 will keep the current flowing through controlled rectifier 76 from appreciably exceeding one hundred and fifty amperes; because that thermistor will render that controlled rectifier non-conductive as soon as the temperature in the recess in the anode end of that controlled rectifier approaches one hundred and forty-five degrees centigrade.

After the controlled rectifier 76 has been rendered non-conductive, the currents flowing through controlled rectifiers 84 and 92 will increase, if the load and the setting of the movable contact of potentiometer 48 remain unchanged; and those increased currents will increase the temperature-induced heating of those controlled rectifiers. However, as the temperatures in the recesses in the anode ends of those controlled rectifiers approach one hundred and thirty-five degrees centigrade, the resistance of each of the thermistors 590 and 598 will decrease to about nine ohms; and, since the resistance of thermistor 684 will still be less than nine ohms, the combined resistance of reference resistor 184 and thermistors 684, 784 and 884 will be less than two and eighty-eight hundredths ohms—and thus low enough to keep the total current flowing through controlled rectifiers 84 and 92 from exceeding four hundred and fifty amperes. As the controlled rectifiers 84 and 92 are heating, the controlled rectifier 76 will be cooling; and, before the temperature in the recess in the anode end of either of controlled rectifiers 84 and 92 can reach one hundred and forty-five degrees centigrade, the temperature in the recess in the anode end of controlled rectifier 76 will fall below one hundred and forty-five degrees centigrade, and thermistor 582 will again permit firing of controlled rectifier 76. Thereupon, the currents flowing through controlled rectifiers 84 and 92 will drop, and the temperature in the recess in the anode end of each of those controlled rectifiers will drop. In this way, the thermistors 582, 590 and 598 will coact with the thermistors 684, 784 and 884 to protect the controlled rectifiers 76, 84 and 92 against injury due to heavy, steady-state currents.

Instead of replacing the resistors 82, 90 and 98 of FIG. 1A with positive temperature coefficient thermistors, such as the thermistors 582, 590 and 598 of FIG. 3, to protect the controlled rectifiers 76, 84 and 92, it would be possible to leave the resistors 82, 90 and 98 of FIG. 1A undisturbed and to replace the resistors 80, 88 and 96 of FIG. 1A with negative temperature coefficient thermistors. Where that is done, and where one or more of the controlled rectifiers 76, 84 and 92 becomes heated, the resistance of the thermistor associated with that controlled rectifier will be quite small; and the maximum voltage drop that can be developed across that thermistor will be so low that insufficient current will be able to flow through the gate-to-cathode circuit of that controlled rectifier to fire that controlled rectifier. As a result, the heated controlled rectifier will become non-conductive, and will thus be protected against injury. That controlled rectifier will then start to cool; and, when the temperature of that controlled rectifier falls to a sufficiently low level, the resistance of the thermistor associated with that controlled rectifier will increase to the point where the voltage drop across it will again be sufficient to cause the gate-to-cathode circuit of that controlled rectifier to pass enough current to fire that controlled rectifier.

Where negative temperature coefficient thermistors are substituted for the resistors 80, 88 and 96, the resistors 78, 86 and 94 can again be eliminated. The protection which the resistors 78, 86 and 94 are intended to provide for the controlled rectifiers 76, 84 and 92 will not be needed; because the thermistors substituted for the resistors 80, 88 and 96 will provide that protection. As indicated hereinbefore, the elimination of the resistors 78, 86 and 94 will permit an increase in the overall efficiency of the control system.

While FIGS. 1A and FIG. 3 show three controlled rectifiers carrying the current that flows through the motor windings 20 and 22, more or fewer controlled rectifiers could be used. Where more controlled rectifiers are used, one additional thermistor will be added for each additional controlled rectifier in FIG. 1A, and two additional thermistors will be added for each additional controlled rectifier in FIG. 3. Where fewer controlled rectifiers are used, one fewer thermistor will be used in FIG. 1A for each controlled rectifier that is eliminated; and two fewer thermistors will be used in FIG. 3 for each controlled rectifier that is eliminated. Where more controlled rectifiers are used, the ohmic values of all of the thermistors used with those controlled rectifiers should be larger than the ohmic values of the thermistors 684, 784 and 884. Conversely, where fewer controlled rectifiers are used, the ohmic values of all of the thermistors used with those controlled rectifiers should be smaller than the ohmic values of the thermistors 684, 784 and 884.

FIG. 4 shows a sub-circuit which utilizes just one controlled rectifier; and that sub-circuit can be substituted for the sub-circuit enclosed by dotted lines in FIG. 1A if a controlled rectifier of sufficiently large current-carrying capacity becomes commercially practical or if the size of the motor of FIG. 1A is reduced. Essentially, the substitution of the sub-circuit of FIG. 4 for the sub-circuit enclosed by dotted lines in FIG. 1A constitutes the elimination from FIG. 1A of controlled rectifiers 76 and 92, of resistors 78, 86 and 94, of resistors 80, 82, 96 and 98, and the elimination from FIG. 1B of thermistors 684 and 884.

The thermistor 784 of FIG. 1B will be mounted in intimate heat-exchanging relationship with the controlled rectifier 584 in FIG. 4; and that thermistor will be a negative temperature coefficient thermistor. Whatever the controlled rectifier 266 in FIG. 1B becomes conductive, the current flowing through resistor 90, the gate-to-cathode circuit of controlled rectifier 584, and junctions 110 and 112 to conductor 207 will render the controlled rectifier 584 conductive. That controlled rectifier will subsequently be rendered non-conductive in the manner in which the controlled rectifiers 76, 84 and 92 of FIG. 1A are rendered non-conductive. In the event the controlled rectifier 584 becomes heated, the thermistor 784 which is in intimate heat-exchanging relation with that controlled rectifier, will experience a sufficient decrease in the resistance thereof to cause the differential amplifiers to reduce the level of current flowing through the motor windings 20 and 22 and through that controlled rectifier. The resulting reduction in the value of the current flowing through controlled rectifier 584 will keep that controlled rectifier from being injured; but the electrically-driven vehicle will not be forced to come to a stop. Instead, that electrically-driven vehicle will continue to receive power from the battery 64, albeit at a reduced level, until such time as the condition of the load or the setting of the movable contact of the potentiometer 48 changes.

If desired, the thermistor 784 which is associated with the controlled rectifier 584 in FIG. 4 could be removed; and, where that was done, a positive temperature coefficient thermistor could be substituted for the resistor 158 in FIG. 1A. Thus, as shown by FIG. 5, a thermistor 658 could be substituted for the resistor 158 in FIG. 1A; and, where that was done, a resistor 660 would be connected to the junction 114, adjacent the negative terminal of battery 64, by a junction 664; and that resistor would also be connected to the thermistor 658 by a junction 662. The room-temperature resistance of the thermistor 658 would be approximately one hundred and eighty ohms, but the temperature of that thermistor would increase if the controlled rectifier 584 tended to become heated. If the controlled rectifier 584 became heated, the temperature of the thermistor 658 would increase; and the resistance of that thermistor would increase sufficiently to enable the voltage drop across that thermistor to cause the differential amplifiers to reduce the average level of current flowing through the motor windings 20 and 22, and thus through the controlled rectifier 584. While the value of the current conducted by that controlled rectifier during each "on" time of that controlled rectifier would be unchanged, the length of each "on" time of that controlled rectifier would be reduced; and hence the average level of current flowing through that controlled rectifier would be reduced. This is desirable because it would keep that controlled rectifier from being injured through overheating.

If desired, the resistor 158 of the control system of FIG. 1A, as modified by FIG. 4, could be left undisturbed; and a negative temperature coefficient thermistor could be substituted for the resistor 660 in FIG. 5. In such event, FIG. 5 would have the resistor 158 in the position occupied by the thermistor 658, and would have a negative temperature coefficient thermistor in the position occupied by the resistor 660. If that thermistor became heated, in response to heating of the controlled rectifier 584 in FIG. 4, the resistance of that thermistor would decrease substantially. That thermistor would then permit the level of current flowing through the resistor 158 to increase, with a consequent increase in the voltage drop across that resistor. The differential amplifiers would then respond to that increase in voltage drop to reduce the average level of current flowing through the motor windings 20 and 22 and through the controlled rectifier 584. In this way, that controlled rectifier would be protected against injury from overheating.

In the sub-circuit shown by FIG. 5, and in the suggested modification of that sub-circuit, the heating of the controlled rectifier 584 does not shut off the power being supplied to the motor windings 20 and 22. Instead, those motor windings will continue to receive power, albeit at a reduced level.

The protective arrangements of FIGS. 1A and 1B, and 3–5 are very useful with circuits wherein controlled rectifiers supply power to a load. However, the protective arrangement of the present invention can be used with circuits wherein devices other than controlled rectifiers supply power to a load. For example, in FIG. 6 a transistor supplies power to a load; and the protective arrangement provided by the present invention protects that transistor.

In FIG. 6, the numeral 600 denotes a D.C. source, such as a battery; and the positive terminal of that battery is connected to the emitter of a PNP transistor 610 by junctions 602, 604 and 606 and a diode 608. The collector of that transistor is connected to one terminal of a load 612, and the other terminal of that load is connected to the negative terminal of the battery by a junction 614, a resistor 616, an adjustable resistor 618, and junctions 620 and 622. One terminal of a resistor 626 is connected to the base of the transistor 610 by a junction 624, and the other terminal of that resistor is connected to the junction 606. The numerals 628 and 630 denote the NPN transistors of a differential amplifier; and the emitters of those transistors are connected together by a junction 632. A common emitter resistor 634 has the upper end thereof connected to the junction 632, and has the lower end thereof connected to the junction 620 by a junction 636. The collector of the transistor 628 is connected to the positive terminal of the battery 600 by a resistor 638, a junction 640, and the junction 602. The collector of the transistor 630 is connected to the base of the transistor 610 by a resistor 642 and the junction 624. A resistor 644 and a Zener diode 648 are connected in series between the junctions 640 and 636; and a junction 646, intermediate that resistor and that Zener diode, is connected to the base of the transistor 630. A negative temperature coefficient thermistor 650 and resistor 654 are connected in series between the junctions 604 and 622. A junction 652, intermediate that thermistor and resistor, is connected to the base of the transistor 628 by a diode 656 and a junction 660. A diode 658 is connected intermediate the junctions 614 and 660.

Current will flow from the positive terminal of battery 600 via junctions 602 and 640, resistor 644, junction 646, Zener diode 648, and junctions 636, 620 and 622 to the negative terminal of that battery; and that Zener diode will respond to that current flow to provide a fixed positive voltage at the base of transistor 630. Current also will flow from the positive terminal of battery 600 via junctions 602, 604 and 606, resistor 626, junction 624, resistor 642, transistor 630, junction 632, resistor 634, and junctions 636, 620 and 622 to the negative terminal of that battery; and the resulting voltage drop across resistor 626 will make the base of transistor 610 negative relative to the emitter of that transistor. Current will also flow from the positive terminal of battery 600 via junctions 602, 604 and 606, diode 608, transistor 610, load 612, junction 614, resistor 616, adjustable resistor 618, and junctions 620 and 622 to the negative terminal of that battery; and the resulting voltage drops across resistor 616 and adjustable resistor 618 will develop a positive voltage at the junction 614. Current will additionally flow from the positive terminal of battery 600 via junctions 602 and 604, the thermistor 650, junction 652, resistor 654, and junction 622 to the negative terminal of that battery; and the resulting voltage drop across resistor 654 will develop a positive voltage at the junction 652. If the voltage at junction 614 exceeds the voltage at junction 652, the diode 656 will be back-biased and the diode 658 will apply the voltage at junction 614 to the base of transistor 628. However, of the voltage at junction 652 exceeds the voltage at junction 614, the diode 658 will be back-biased, and the diode 656 will apply the voltage at junction 652 to the base of transistor 628. Additionally, current will flow from the positive terminal of battery 600 via junctions 602 and 640, resistor 638, transistor 628, junction 632, resistor 634, and junctions 636, 620 and 622 to the negative terminal of that battery.

In the event the current flowing through transistor 610 and load 612 tends to increase, the voltage drops across resistor 616 and adjustable resistor 618 will tend to increase, and thereby tend to make the base of transistor 628 more positive. The resulting increase in conductivity of that transistor will increase the voltage drop across the common emitter resistor 634, and will thus make the emitter of transistor 630 more positive relative to the base of that transistor. The resulting decrease in conductivity of the transistor 630 will reduce the amount of current flowing through resistor 626, resistor 642, transistor 630, and resistor 634; and the resulting decrease in voltage drop across the resistor 626 will make the base of the transistor 610 less negative relative to the emitter of that transistor. The resulting decrease in conductivity of that transistor will cause the value of the current flowing through the load 612 to decrease to the desired level.

Conversely, if the value of the current flowing through transistor 610, load 612, resistor 616, and adjustable resistor 618 tends to fall below the desired level, the voltage drops across resistor 616 and adjustable resistor 618 will tend to decrease and thus tend to make the base of transistor 628 less positive. The resulting decrease in conductivity of that transistor will reduce the voltage drop across the resistor 634, and will thus make the emitter of transistor 630 less positive as to the base of that transistor. The resulting increase in conductivity of transistor 630 will increase the amount of current flowing through resistor 626, resistor 642, transistor 630, and resistor 634; and the resulting increase in voltage drop across the resistor 626 will make the base of the transistor 610 more negative relative to the emitter of that transistor. The resulting increase in conductivity of that transistor will cause the value of the current flowing through the load 612 to increase to the desired value. In this way, the circuit shown by FIG. 6 will tend to keep the current flowing through transistor 610 and load 612 substantially constant.

The thermistor 650 is mounted in intimate heat-exchanging relation with the stud of the transistor 610; and, as a result, the temperature of the thermistor 650 will essentially be the same as the temperature of the transistor 610. In the event the value of the power dissipated in the transistor 610 should, somehow, increase to the point where that transistor began to heat unduly, the resistance of the thermistor 650 would decrease substantially and thus cause the voltage at junction 652, and hence at the base of transistor 628, to increase substantially. The increased voltage at the base of transistor 628 would increase the conductivity of that transistor, with a consequent decrease in the conductivity of transistor 630. The resulting decrease in current flowing through resistor 626 would decrease the voltage drop across that resistor; and, thereupon, the base of transistor 610 would become less negative to the emitter of that transistor. The resulting reduced conductivity of the transistor 610 would decrease the amount of current flowing through that transistor, and would thus decrease the heating of that transistor. In this way, the thermistor 650 can cause the level of current flowing through the transistor 610 to be reduced, and can thus enable that transistor to cool down to the desired temperature level.

As the transistor cools down, the thermistor 650 also will cool down; and that thermistor will then experience an increase in the resistance thereof. That increase in resistance will enable the voltage at the junction 652, and hence at the base of transistor 628, to decrease; and the resulting decrease in conductivity of that transistor will cause the conductivity of the transistor 630 to increase. The resulting increase in voltage drop across the resistor 626 will enable the base of transistor 610 to approach its normal voltage, and will thus enable the conductivity of that transistor to increase to the desired level.

It will be noted that when the thermistor 650 became heated and caused the differential amplifier to change the conductivity of the transistor 610, that thermistor did not shut off the power supply to the load 612. Consequently, in the circuit of FIG. 6, as well as in the circuits of FIGS. 1A and 1B, and 3–5, the thermistor provides protection but does not shut off the power to the load.

The protective arrangement provided by the present invention is very useful in connection with a control system for an electrically-driven vehicle. However, that protective arrangement can be used in connection with other control systems. Further, that protective arrangement is not limited to the protecting of controlled rectifiers and transistors. Instead, that protective arrangement can be used to protect other current-controlling elements, to protect current-utilizing elements, such as motors, and to protect various other current-carrying elements. The primary requirement of a control system in which the protective arrangement of the present invention is used is that the thermistor be mounted in intimate heat-exchanging relation with the current-carrying element and that the temperature-induced change in resistance of that thermistor affect the value of the current flowing through that current-carrying element without shutting off the current through that current-carrying element.

It should be noted that the thermistors of the protective arrangements provided by the present invention are not connected in series with the loads and are not connected in parallel with those loads. Instead, those thermistors are incorporated into sub-circuits which provide reference signals that are used to control the load currents. This is desirable because it means that those thermistors do not have to carry heavy currents—those thermistors merely having to carry reference-level currents. As a result, smaller and less expensive thermistors can be used; and less power will be dissipated in those thermistors.

The current values and the temperature values that have been stated herein are illustrative only; and other current values and other temperature values could be used. Further, other control circuits could be used. In actual practice, the temperature in the recess in the anode end of a controlled rectifier will be closer to twenty-five degrees centigrade, rather than fifteen degrees centigrade, below the junction temperature of that controlled rectifier.

It is possible in FIGS. 1A and 1B to increase the allowable levels of limited-duration currents flowing through the controlled rectifiers 76, 84 and 92, while still protecting those controlled rectifiers, by using the protective arrangement of the present invention in conjunction with the protective arrangement of the said Hoyt application. To do this, the Zener diode and series-connected resistor of the Hoyt protective arrangement should be connected between the right-hand terminal of resistor 158 and junction 106, the averaging capacitor of the Hoyt protective arrangement should be connected between the anode of that Zener diode and junction 139, and the ohmic resistances of thermistors 684, 784 and 884 and of reference resistor 184 should be materially increased.

The thermistors 684, 784 and 884 would respond to any increases in the temperatures of the controlled rectifiers 76, 84 and 92 to decrease the allowable maximum levels of current flowing through those controlled rectifiers; but, because the ohmic resistances of reference resistor 184 and of thermistors 684, 784 and 884 would be materially higher than in FIGS. 1A and 1B, those decreases in the allowable maximum levels of current flowing through those controlled rectifiers would be very small. Even when the average voltage across the motor windings 20 and 22 approached twenty volts, the allowable maximum levels of current flowing through the controlled rectifiers 76, 84 and 92 would be well in excess of four hundred and fifty amperes. If the average voltage across the motor windings 20 and 22 reached and then exceeded twenty volts, the protective arrangement of the Hoyt application would begin to decrease the allowable maximum levels of current flowing through the controlled rectifiers 76, 84 and 92. Also, the thermistors 684, 784 and 884 would respond to the temperatures of those controlled rectifiers to further decrease the allowable maximum levels of current flowing through those controlled rectifiers. However, if the average voltage across the motor windings 20 and 22 reached its maximum value and if the junction temperatures of the controlled rectifiers 76, 84 and 92 reached one hundred and fifty degrees centigrade, the protective arrangements of the Hoyt application and the present application would keep the steady-state current flowing through those controlled rectifiers from exceeding four hundred and fifty amperes but would enable those currents to closely approach four hundred and fifty amperes. As a result, the use of the protective arrangement of the present invention in conjunction with the protective arrangement of the said Hoyt application would protect the controlled rectifiers 76, 84 and 92 while increasing the allowable levels of limited-duration currents flowing through those controlled rectifiers.

Whereas the drawing and the accompanying description have shown and described several preferred embodiments of the present invention, it should be apparent to those skilled in the art that various changes may be made in the form of the invention without affecting the scope thereof.

What I claim is:

1. A control system which includes a controlled rectifier and a protective arrangement therefor and which comprises:
   (a) a controlled rectifier with a recess in the anode end thereof,
   (b) a thermistor mounted in said recess in said anode end of said controlled rectifier, and thus in intimate heat-transferring relation with said controlled rectifier,
(c) a circuit that selectively renders said controlled rectifier conductive and non-conductive, and
(d) a connection between said thermistor and said circuit which enables reductions in the resistance of said thermistor to decrease the "on" time of said controlled rectifier and thereby reduce the average current carried by said controlled rectifier,
(e) said thermistor being a negative temperature coefficient thermistor,
(f) said circuit including a reference resistor that helps control the "on" time of said controlled rectifier, and said thermistor being connected in parallel with said reference resistor,
(g) said thermistor and said circuit responding to heating of said controlled rectifier to reduce the "on" time of said controlled rectifier while permitting said controlled rectifier to be rendered conductive.

2. A control system which includes a controlled rectifier and a protective arrangement therefor and which comprises:
(a) a controlled rectifier,
(b) a thermistor mounted in intimate heat-transferring relation with said controlled rectifier,
(c) a circuit that selectively renders said controlled rectifier conductive,
(d) a connection between said thermistor and said circuit which enables reductions in the resistance of said thermistor to decrease the "on" time of said controlled rectifier and thereby reduce the average current carried by said controlled rectifier,
(e) said thermistor being a negative temperature coefficient thermistor,
(f) said thermistor and said circuit responding to heating of said controlled rectifier to reduce the "on" time of said controlled rectifier while permitting said controlled rectifier to be rendered conductive.

3. A control system which includes a controlled rectifier and a protective arrangement therefor and which comprises:
(a) a controlled rectifier,
(b) a thermistor mounted in intimate heat-transferring relation with said controlled rectifier,
(c) a circuit that selectively renders said controlled rectifier conductive, and
(d) a connection between said thermistor and said circuit which enables a predetermined change in the resistance of said thermistor to decrease the "on" time of said controlled rectifier and thereby reduce the average current carried by said controlled rectifier,
(e) said thermistor and said circuit responding to heating of said controlled rectifier to reduce the "on" time of said controlled rectifier while permitting said controlled rectifier to be rendered conductive,
(f) said thermistor being a positive temperature coefficient thermistor,
(g) said thermistor being part of a voltage divider,
(h) said thermistor having a relatively small voltage drop across it whenever said controlled rectifier is cool, but having a relatively large voltage drop across it whenever said controlled rectifier is heated.

4. A control system which includes a controlled rectifier and a protective arrangement therefor and which comprises:
(a) a controlled rectifier,
(b) a thermistor mounted in intimate heat-transferring relation with said controlled rectifier,
(c) a circuit that selectively renders said controlled rectifier conductive, and
(d) a connection between said thermistor and said circuit which enables a predetermined change in the resistance of said thermistor to decrease the "on" time of said controlled rectifier and thereby reduce the average current carried by said controlled rectifier,
(e) said thermistor and said circuit responding to heating of said controlled rectifier to reduce the "on" time of said controlled rectifier while permitting said controlled rectifier to be rendered conductive.

5. A control system which includes a controlled rectifier and a protective arrangement therefor and which comprises:
(a) a controlled rectifier,
(b) a thermistor mounted in intimate heat-transferring relation with said controlled rectifier,
(c) a circuit that selectively renders said controlled rectifier conductive, and
(d) a connection between said thermistor and said circuit which enables a predetermined change in the resistance of said thermistor to decrease the "on" time of said controlled rectifier and thereby reduce the average current carried by said controlled rectifier,
(e) said circuit including a reference resistor that helps control the "on" time of said controlled rectifier, and said thermistor being connected in parallel with said reference resistor,
(f) said thermistor responding to heating of said controlled rectifier to act as a low resistance shunt to said reference resistor.

6. A control system which includes a current-controlling element and a protective arrangement therefor and which comprises:
(a) a current-controlling element with a recess therein,
(b) a thermistor mounted in said recess in said current-controlling element, and thus in intimate heat-transferring relation with said current-controlling element,
(c) a circuit that determines the conductivity of said current-controlling element, and
(d) a connection between said thermistor and said circuit which enables a predetermined change in the resistance of said thermistor to decrease the current flowing through said current-controlling element,
(e) said thermistor and said circuit responding to heating of said current-controlling element to reduce the current flowing through said current-controlling element while permitting said current-controlling element to be conductive.
(f) said current-controlling element being a controlled rectifier,
(g) said circuit being adapted to vary the "on" time of said controlled rectifier.

7. A control system which includes a current-controlling element and a protective arrangement therefor and which comprises:
(a) a current-controlling element with a recess therein,
(b) a thermistor mounted in said recess in said current-controlling element, and thus in intimate heat-transferring relation with said current-controlling element,
(c) a circuit that determines the conductivity of said current-controlling element,
(d) a connection between said thermistor and said circuit which enables a predetermined change in the resistance of said thermistor to decrease the current flowing through said current-controlling element,
(e) said thermistor and said circuit responding to heating of said current-controlling element to reduce the current flowing through said current-controlling element while permitting said current-controlling element to be conductive,
(f) said current-controlling element being a transistor,
(g) said circuit being adapted to change the bias on said transistor and thereby vary the current flowing through said transistor.

8. A control system which includes a plurality of parallel-connected controlled rectifiers and a protective arrangement therefor and which comprises:

(a) a controlled rectifier that can be rendered conductive to pass current to a load,
(b) a second controlled rectifier that can be rendered conductive to pass current to a load,
(c) said controlled rectifiers being connected in parallel,
(d) a thermistor mounted in heat-transferring relation with the first said controlled rectifier,
(e) a second thermistor mounted in heat-transferring relation with said second controlled rectifier,
(f) a circuit that selectively renders said controlled rectifiers conductive,
(g) connections between said thermistors and said circuit which enable a predetermined change in the resistance of one or the other of said thermistors to decrease the "on" times of both of said controlled rectifiers and thereby reduce the average current carried by said controlled rectifiers,
(h) a third thermistor mounted in heat-transferring relation with the first said controlled rectifier,
(i) a fourth thermistor mounted in heat-transferring relation with said second controlled rectifier, and
(j) connections between said third and said fourth thermistors and said circuit which enable a second predetermined change in the resistance of one or the other of said third and fourth thermistors to keep said one or said other of said controlled rectifiers non-conductive,
(k) said third and said fourth thermistors and said circuit responding to heating of one or the other of said controlled rectifiers to keep said one or said other of said controlled rectifiers non-conductive while permitting the remaining controlled rectifier to become conductive,
(l) the first said and said second thermistors and said circuit responding to heating of one or the other of said controlled rectifiers to reduce the average level of current supplied to said load while permitting continued supplying of current to said load,
(m) said circuit including a reference resistor that helps set the level of current supplied to said load,
(n) the first said and said second thermistors being connected in parallel with said reference resistor,
(o) said circuit including a sub-circuit that "fires" said controlled rectifiers,
(p) said sub-circuit including said third and said fourth thermistors.

9. A control system which includes a plurality of parallel-connected controlled rectifiers and a protective arrangement therefor and which comprises:
(a) a controlled rectifier that can be rendered conductive to pass current to a load,
(b) a second controlled rectifier that can be rendered conductive to pass current to a load,
(c) said controlled rectifiers being connected in parallel,
(d) a thermistor mounted in heat-transferring relation with the first said controlled rectifier,
(e) a second thermistor mounted in heat-transferring relation with said second controlled rectifier,
(f) a circuit that selectively renders said controlled rectifiers conductive,
(g) connections between said thermistors and said circuit which enable a predetermined change in the resistance of one or the other of said thermistors to decrease the "on" times of both of said controlled rectifiers and thereby reduce the average current carried by said controlled rectifiers,
(h) said thermistors and said circuit responding to heating of one or the other of said controlled rectifiers to reduce the average level of current supplied to said load while permitting continued supplying of current to said load,
(i) said circuit including a reference resistor that helps set the level of current supplied to said load,
(j) said thermistors being connected in parallel with said reference resistor.

10. A control system which includes a plurality of parallel-connected controlled rectifiers and a protective arrangement therefor and which comprises:
(a) a controlled rectifier that can be rendered conductive to pass current to a load,
(b) a second controlled rectifier that can be rendered conductive to pass current to a load,
(c) said controlled rectifiers being connected in parallel,
(d) a thermistor mounted in heat-transferring relation with the first said controlled rectifier,
(e) a second thermistor mounted in heat-transferring relation with said second controlled rectifier,
(f) a circuit that selectively renders said controlled rectifiers conductive,
(g) connections between said thermistors and said circuit which enable a predetermined change in the resistance of one or the other of said thermistors to decrease the "on" times of both of said controlled rectifiers and thereby reduce the average current carried by said controlled rectifiers,
(h) said thermistors and said circuit responding to heating of one or the other of said controlled rectifiers to reduce the average level of current supplied to said load while permitting continued supplying of current to said load.

11. A control system whiceh includes a plurality of parallel-connected controlled rectifiers and a protective arrangement therefor and which comprises:
(a) a controlled rectifier that can be rendered conductive to pass current to a load,
(b) a second controlled rectifier that can be rendered conductive to pass current to a load,
(c) said controlled rectifiers being connected in parallel,
(d) a thermistor mounted in heat-transferring relation with the first said controlled rectifier,
(e) a second thermistor mounted in heat-transferring relation with said second controlled rectifier,
(f) a circuit that selectively renders said controlled rectifiers conductive,
(g) connections between said thermistors and said circuit which enable a predetermined change in the resistance of one or the other of said thermistors to decrease the "on" times of both of said controlled rectifiers and thereby reduce the average current carried by said controlled rectifiers,
(h) a third thermistor mounted in heat-transferring relation with the first said controlled rectifier,
(i) a fourth thermistor mounted in heat-transferring relation with said second controlled rectifier, and
(j) connections between said third and said fourth thermistors and said circuit which enable a second predetermined change in the resistance of one or the other of said third and fourth thermistors to keep said one or said other of said controlled rectifiers non-conductive,
(k) said third and said fourth thermistors and said circuit responding to heating of one or the other of said controlled rectifiers to keep said one or said other of said controlled rectifiers non-conductive while permitting the remaining controlled rectifier to become conductive,
(l) the first said and said second thermistors and said circuit responding to heating of said controlled rectifiers to reduce the average level of current supplied to said load while permitting continued supplying of current to said load,
(m) said circuit including a sub-circuit that "fires" said controlled rectifiers.

12. A control system which includes a plurality of parallel-connected controlled rectifiers and a protective arrangement therefor and which comprises:

(a) a controlled rectifier than can be rendered conductive to pass current to a load,
(b) a second controlled rectifier that can be rendered conductive to pass current to a load,
(c) said controlled rectifiers being connected in parallel,
(d) a thermistor mounted in heat-transferring relation with the first said controlled rectifier,
(e) a second thermistor mounted in heat-transferring relation with said second controlled rectifier,
(f) a circuit that selectively renders said controlled rectifiers conductive, and
(g) connections between said thermistors and said circuit which enable a predetermined change in the resistance of one or the other of said thermistors to keep one or the other of said controlled rectifiers non-conductive,
(h) thereby obviating any need of current-sharing impedances in series with said controlled rectifiers.

13. A control system which includes a current-carrying element and a protective arrangement therefor and which comprises:
(a) a current-carrying element,
(b) a thermistor mounted in heat-exchanging relation with said current-carrying element,
(c) a circuit that controls the amount of current flowing through said current-carrying element,
(d) a connection between said thermistor and said circuit which enables a predetermined change in the resistance of said thermistor to decrease the current flowing through said current-carrying element,
(e) said thermistor and said circuit responding to heating of said current-carrying element to reduce the current flowing through said current-carrying element while permitting current to continue to flow through said current-carrying element, (f) said circuit establishing a reference which controls the current that flows through said current-carrying element, (g) said thermistor being adapted to change said reference.

14. A control system which includes a current-controlling element and a protective arrangement therefor and which comprises:

(a) a current-controlling element with a recess therein,
(b) a thermistor mounted in said recess in said current-controlling element, and thus in intimate heat-transferring relation with said current-controlling element,
(c) a circuit that determines the conductivity of said current-controlling element,
(d) a connection between said thermistor and said circuit which enables a predetermined change in the resistance of said thermistor to decrease the current flowing through said current-controlling element,
(e) said thermistor and said circuit responding to heating of said current-controlling element to reduce the current flowing through said current-controlling element while permitting said current-controlling element to be conductive.

15. A control system which includes a current-carrying element and a protective arrangement therefor and which comprises:
(a) a current-carrying element,
(b) a thermistor mounted in heat-exchanging relation with said current-carrying element,
(c) a circuit that controls the amount of current flowing through said current-carrying element,
(d) a connection between said thermistor and said circuit which enables a predetermined change in the resistance of said thermistor to decrease the current flowing through said current-carrying element,
(e) said thermistor and said circuit responding to heating of said current-carrying element to reduce the current flowing through said current-carrying element while permitting current to continue to flow through said current-carrying element.

References Cited

UNITED STATES PATENTS 3,293,540   12/1966   Silard et al. _____ 307—310

ARTHUR GAUSS, *Primary Examiner.*

B. P. DAVIS, *Assistant Examiner.*